(12) United States Patent
Wang et al.

(10) Patent No.: US 9,318,773 B2
(45) Date of Patent: Apr. 19, 2016

(54) LITHIUM BATTERY

(71) Applicants: National Taiwan University of Science and Technology, Taipei (TW); Chung Yuan Christian University, Taoyuan County (TW)

(72) Inventors: Fu-Ming Wang, Hsinchu (TW); Chin-Shu Cheng, Hsinchu County (TW); Wei-Jen Liu, Taoyuan County (TW)

(73) Assignees: National Taiwan University of Science and Technology, Taipei (TW); Chung Yuan Christian University, Chung-Li (TW)

( * ) Notice: Subject to any disclaimer, the term of this patent is extended or adjusted under 35 U.S.C. 154(b) by 0 days.

(21) Appl. No.: 13/743,348

(22) Filed: Jan. 17, 2013

(65) Prior Publication Data

US 2014/0093771 A1 Apr. 3, 2014

(30) Foreign Application Priority Data

Sep. 28, 2012 (CN) .......................... 2012 1 0370413

(51) Int. Cl.
| | |
|---|---|
| *H01M 10/056* | (2010.01) |
| *H01M 10/052* | (2010.01) |
| *H01M 4/485* | (2010.01) |
| *H01M 4/587* | (2010.01) |
| *H01M 10/0567* | (2010.01) |

(52) U.S. Cl.
CPC ............ *H01M 10/056* (2013.01); *H01M 4/485* (2013.01); *H01M 4/587* (2013.01); *H01M 10/052* (2013.01); *H01M 10/0567* (2013.01); *H01M 2300/0025* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 6,045,948 A | 4/2000 | Wang et al. | |
| 6,074,777 A | 6/2000 | Reimers et al. | |
| 7,875,204 B2 * | 1/2011 | Pan et al. | 252/182.1 |
| 2007/0148555 A1 * | 6/2007 | Fukaya et al. | 429/331 |
| 2009/0142670 A1 | 6/2009 | Wang et al. | |
| 2009/0305132 A1 * | 12/2009 | Gauthier et al. | 429/207 |
| 2009/0311611 A1 | 12/2009 | Wu et al. | |

(Continued)

FOREIGN PATENT DOCUMENTS

| | | |
|---|---|---|
| CN | 101471456 | 7/2009 |
| JP | 2001-172083 | 6/2001 |

(Continued)

OTHER PUBLICATIONS http://nationalnanomaterials.com/technology/ Sep. 4, 2014.*

(Continued)

*Primary Examiner* — Patrick Ryan
*Assistant Examiner* — Christopher Domone
(74) *Attorney, Agent, or Firm* — Jianq Chyun IP Office

(57) ABSTRACT

A lithium battery, including an anode, a cathode, an electrolyte solution and a package structure. The anode includes a material having an oxygen-containing functional group. The cathode and the anode are configured separately, and a housing region is defined between the cathode and the anode. The electrolyte solution is disposed in the housing region, and the electrolyte solution includes water and an additive. The package structure covers the anode, the cathode and the electrolyte solution.

18 Claims, 1 Drawing Sheet

(56) References Cited

U.S. PATENT DOCUMENTS

| | | | |
|---|---|---|---|
| 2010/0291438 A1* | 11/2010 | Ahn et al. | 429/212 |
| 2011/0003209 A1* | 1/2011 | Katayama et al. | 429/246 |
| 2011/0117444 A1* | 5/2011 | Wang et al. | 429/328 |
| 2012/0214048 A1 | 8/2012 | Wang et al. | |

FOREIGN PATENT DOCUMENTS

| | | |
|---|---|---|
| JP | 2003-234127 | 8/2003 |
| JP | 2004-235145 | 8/2004 |
| JP | 2010-192457 | 9/2010 |
| JP | 2013-108186 | 6/2013 |
| JP | 2013539591 | 10/2013 |
| TW | 200926479 | 6/2009 |
| TW | 201001781 | 1/2010 |
| TW | 201228075 | 7/2012 |
| TW | 201236238 | 9/2012 |
| WO | 2010095716 | 8/2010 |

OTHER PUBLICATIONS

Wang et al, "Novel SEI formation of maleimide based additives and its improvement of capability and cyclicability in lithium ion batteries," 214th ECS Meeting, Oct. 12-17, 2008, pp. 1.

Wang et al., "Novel SEI formation of maleimide based additives and its improvement of capability and cyclicability in lithium ion batteries," Eletrochimica Acta 54 (12), Apr. 30, 2009, pp. 3344-3351.

Wang et al., "The substituent positions effects of novel SEI formation of maleimide based additives and its rate enhancement in lithium ion battery," 15th International Meeting on Lithium Batteries, Jun. 27-Jul. 2, 2010, pp. 1.

Wang et al., "Breakthrough additive technology for improving the performance of high-power lithium ion batteries," MRS Communications 2 (1), Mar. 2012, pp. 5-7.

Devi et al., "Synthesis and Characterization of Moisture-Cured Polyurethane Membranes and Their Applications in Pervaporation Separation of Ethyl Acetate/Water Azeotrope at 30C," Journal of Applied Polymer Science 103, Mar. 5, 2007, pp. 3405-3414.

Nam et al., "Graphene p-n-p junctions controlled by local gates made of naturally oxidized thin aluminium films," Carbon 50, Apr. 2012, pp. 1987-1992.

Hummers et al., "Preparation of Graphitic Oxide," Journal of the American Chemical Society, Mar. 20, 1958, pp. 1339.

Cheng et al., "The electrochemical performance improvement of water as an additive to graphene-based anode materials," 222nd ECS Meeting, Oct. 2012, pp. 1.

Cheng et al., "Aqueous Additive for Lithium Ion Batteries: Promotes Novel Solid Electrolyte Interface (SEI) Layer with Overall Cost Reduction," International Journal of Electrochemical Science 7, Sep. 1, 2012, pp. 8676-8687.

"Office Action of Taiwan Counterpart Application", issued on May 19, 2014, p. 1-p. 5.

"Office Action of Japan Counterpart Application", issued on Mar. 18, 2014, p. 1-p. 2.

* cited by examiner

LITHIUM BATTERY

CROSS-REFERENCE TO RELATED APPLICATION

This application claims the priority benefit of China application serial no. 201210370413.X, filed on Sep. 28, 2012. The entirety of the above-mentioned patent application is hereby incorporated by reference herein and made a part of this specification.

BACKGROUND OF THE INVENTION

1. Field of the Invention

The invention relates to a battery, more particularly to a lithium battery.

2. Description of Related Art

Since the primary battery is not environmental friendly, the market demand for lithium batteries with characteristics such as rechargeability, light weight, high voltage value, and high energy density has been growing in recent years. Therefore, the current performance requirements for lithium batteries such as light weight, durability, high voltage, high energy density, and high safety have become higher. In particular, lithium batteries are highly potential in applicability and expandability in the light electric vehicle, electrical vehicle and large-scale electricity storage industries.

However, in the currently known techniques, the fabrication of lithium batteries must be carried out in a dry atmosphere with low moisture content, with the main reason being that the water causes electrolysis during electrochemical reaction in the case of too much moisture in the lithium battery, and the resulting gas production affects the performance of the lithium battery. To overcome the above problem, most manufacturers have to build highly dry drying rooms or need an additional second packaging process, which not only costs too much in electricity to maintain the drying rooms with high drying condition, the degassing process in the reserve gas rooms also costs additional expenses and time.

SUMMARY OF THE INVENTION

The invention provides a lithium battery with better performance that may be fabricated in the presence of water.

The invention provides a lithium battery, including an anode, a cathode, an electrolyte solution and a package structure. The anode includes a material having an oxygen-containing functional group. The cathode and the anode are configured separately, and a housing region is defined between the cathode and the anode. The electrolyte solution is disposed in the housing region, and the electrolyte solution includes water and an additive. The package structure covers the anode, the cathode and the electrolyte solution.

In an embodiment of the invention, the lithium battery further includes an isolation film disposed between the anode and the cathode, and the housing region is defined by the isolation film, the anode and the cathode.

In an embodiment of the invention, the material of the isolation film is, for instance, an insulating material.

In an embodiment of the invention, the insulating material is, for instance, polyethylene (PE), polypropylene (PP) or a combination thereof.

In an embodiment of the invention, the oxygen-containing functional group is, for instance, phenol group, quinone group, pyrone group, pyran group, lactone group or a combination thereof.

In an embodiment of the invention, the material is, for instance, carbide.

In an embodiment of the invention, the carbide is, for instance, hard carbon, soft carbon, a carbon black, graphite, graphene, carbon fiber, carbon nanotubes or a mixture thereof.

In an embodiment of the invention, the material having the oxygen-containing functional group is, for instance, metal oxide.

In an embodiment of the invention, the metal oxide is, for instance, $SnO$, $SnO_2$, $GeO$, $GeO_2$, $In_2O$, $In_2O_3$, $PbO$, $PbO_2$, $Pb_2O_3$, $Pb_3O_4$, $Ag_2O$, $AgO$, $Ag_2O_3$, $Sb_2O_3$, $Sb_2O_4$, $Sb_2O_5$, $SiO$, $ZnO$, $CoO$, $NiO$, $FeO$ or a combination thereof.

In an embodiment of the invention, the cathode is, for instance, a lithium metal, a lithium mixed metal oxide or a combination thereof.

In an embodiment of the invention, the lithium mixed metal oxide includes $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$, $LiFePO_4$, $LiMn_{0.5}Ni_{0.5}O_2$, $LiMn_{1/3}Co_{1/3}Ni_{1/3}O_2$, $LiMc_{0.5}Mn_{1.5}O_4$ or a combination thereof, where $0<x<1$, and Mc is a divalent metal.

In an embodiment of the invention, the content of the water is, for instance, 20 ppm to 300 ppm.

In an embodiment of the invention, the content of the water is, for instance, 100 ppm.

In an embodiment of the invention, the additive is, for instance, maleimide, polymaleimide, bismaleimide, polybismaleimide, copolymers of bismaleimide and maleimide, vinylene carbonate or a mixture thereof.

In an embodiment of the invention, the maleimide is, for instance, N-phenylmaleimide, N-(o-methylphenyl)-maleimide, N-(m-methylphenyl)-maleimide, N-(p-methylphenyl)-maleimide, N-cyclohexylmaleimide, maleimide, maleimidophenol, maleimidobenzocyclobutene, phosphorus-containing maleimide, phosphonate-containing maleimide, siloxane-containing maleimide, N-(4-tetrahydropyranyl-oxyphenyl)maleimide, or 2,6-xylylmaleimide.

In an embodiment of the invention, the structural formula of the bismaleimide is shown in Formula 1:

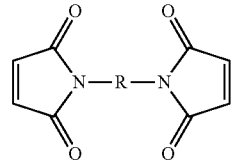

Formula 1 where R includes:

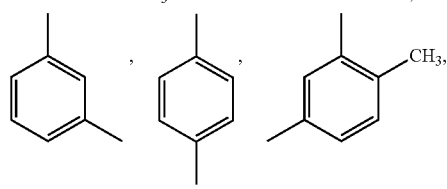

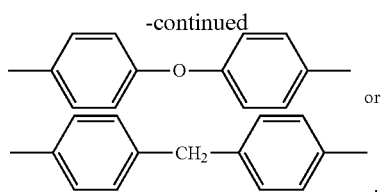

In an embodiment of the invention, the content of the additive is, for instance, 0.05 wt % to 0.5 wt %.

In an embodiment of the invention, the electrolyte solution further includes an organic solvent.

In an embodiment of the invention, the organic solvent is, for instance, γ-butyrolactone (GBL), ethylene carbonate (EC), propylene carbonate (PC), diethyl carbonate (DEC), propyl acetate (PA), dimethyl carbonate (DMC), ethylmethyl carbonate (EMC), or a combination thereof.

In an embodiment of the invention, the content of the organic solvent is, for instance, 95 wt % to 99 wt %.

In an embodiment of the invention, the electrolyte solution further includes an electrolyte.

In an embodiment of the invention, the electrolyte is, for instance, lithium salt.

In an embodiment of the invention, the lithium salt is, for instance, $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$ or a combination thereof.

In an embodiment of the invention, the content of the electrolyte is, for instance, 30 wt % to 40 wt %.

In an embodiment of the invention, the lithium battery further includes a polymer binder that separately reacts with the anode and/or the cathode.

In an embodiment of the invention, the polymer binder is, for instance, polyvinylidene fluoride (PVDF), styrene-butadiene rubber (SBR), polyamide, melamine resin, Carboxymethyl-Cellulose (CMC), a water-based binder (LA132, manufactured by Chengdu Indigo power sources CO., Ltd.) or a combination thereof.

Based on the above, the lithium battery of the invention uses the oxygen-containing functional group of the anode and the additive to conduct electrochemical reaction in the presence of water to produce a self-polymerizing substance, thereby increasing the battery capacity and enhancing the rapid charge-discharge performance.

Moreover, since the lithium battery of the invention may contain water, there is no need to constrain the battery fabrication process to a anhydrous environment as the current technique demands, thus saving the electrical expenditure for maintaining a anhydrous environment for the battery fabrication process, and consequently reducing the fabrication cost.

To make the above features and advantages of the invention more comprehensible, several embodiments accompanied with drawings are described in detail as follows.

DESCRIPTION OF THE EMBODIMENTS

Figure 1:
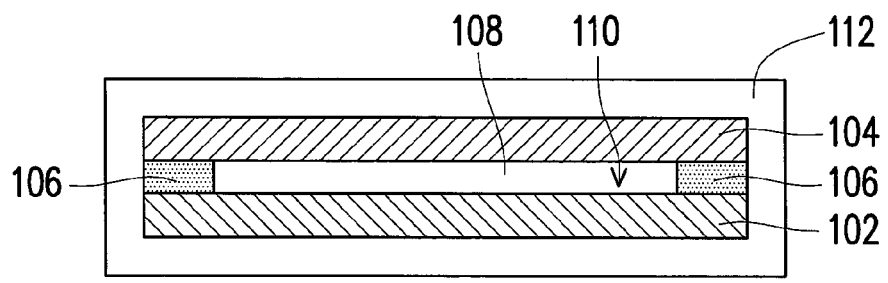
FIG. 1 is a cross-sectional schematic diagram of a lithium battery according to an embodiment of the invention.

FIG. 1 is a cross-sectional schematic diagram of a lithium battery according to one embodiment of the invention.

Referring to FIG. 1, a lithium battery 100 includes an anode 102, a cathode 104, an electrolyte solution 108 and a package structure 112.

The anode 102 includes a material having a oxygen-containing functional group. Moreover, the material used for the anode 102 is, for instance, carbide such as carbon powder, graphite, graphene, carbon fiber, carbon nanotubes or a mixture thereof, and the oxygen-containing functional group of the material is, for instance, phenol group, quinone group, pyrone group, pyran group, lactone group or a combination thereof. In addition to the combination of the substances, the material having the oxygen-containing functional group may also be metal oxide that includes SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO or a combination thereof.

The cathode 104 and the anode 102 are configured separately, and a housing region 110 is defined between the anode 102 and the cathode 104. The cathode 104 is, for instance, a lithium metal, a lithium mixed metal oxide or a combination thereof, wherein the lithium mixed metal oxide may be $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$, $LiFePO_4$, $LiMn_{0.5}Ni_{0.5}O_2$, $LiMn_{1/3}Co_{1/3}Ni_{1/3}O_2$, $LiMc_{0.5}Mn_{1.5}O_4$ or a combination thereof, where $0<x<1$, and Mc is a divalent metal.

The electrolyte solution 108 is disposed in the housing region 110, and the electrolyte solution 108 includes water and an additive. The content of the water in the electrolyte solution 108 is, for instance, 20 ppm to 300 ppm. In an embodiment, the content of the water is, for instance, 100 ppm. Generally speaking, 'anhydrous' is defined as that the content of the water is equal to or less than 20 ppm.

The additive in the electrolyte solution 108 is, for instance, maleimide, polymaleimide, bismaleimide, polybismaleimide, copolymers of bismaleimide and maleimide, vinylene carbonate or a mixture thereof. The content of the additive in the electrolyte solution 108 is, for instance, 0.05 wt % to 0.5 wt %.

Moreover, the maleimide may be N-phenylmaleimide, N-(o-methylphenyl)-maleimide, N-(m-methylphenyl)-maleimide, N-(p-methylphenyl)-maleimide, N-cyclohexylmaleimide, maleimide, maleimidophenol, maleimidobenzocyclobutene, phosphorus-containing maleimide, phosphonate-containing maleimide, siloxane-containing maleimide, N-(4-tetrahydropyranyl-oxyphenyl)maleimide, or 2,6-xylylmaleimide. The structural formula of bismaleimide is, for instance, as shown in Formula 1:

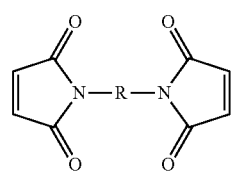

Formula 1 wherein R is, for instance,

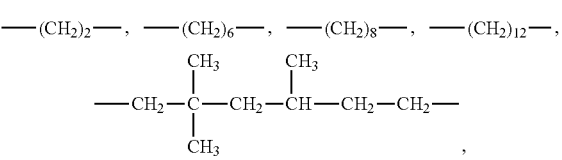

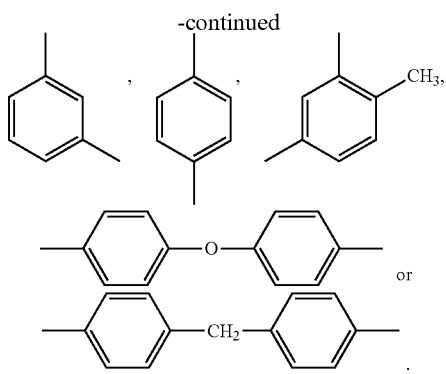

Moreover, the electrolyte solution 108 may further include an organic solvent, and the content of the organic solvent in the electrolyte solution 108 is, for instance, 95 wt % to 99 wt %. The organic solvent is for instance γ-butyrolactone (GBL), ethylene carbonate (EC), propylene carbonate (PC), diethyl carbonate (DEC), propyl acetate (PA), dimethyl carbonate (DMC), ethylmethyl carbonate (EMC), or a combination thereof.

Moreover, the electrolyte solution 108 may further include an electrolyte, and the content of the electrolyte in the electrolyte solution 108 is, for instance, 30 wt % to 40 wt %. The electrolyte is, for instance, lithium salt, and the lithium salt may be $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$ or a combination thereof.

The package structure 112 is used to cover the anode 102, the cathode 104 and the electrolyte solution 108. The material of the package structure 112 is, for instance, aluminum foil.

Moreover, the lithium battery 100 may further include an isolation film 106 disposed between the anode 102 and the cathode 104, and the housing region 110 is defined by the isolation film 106, the anode 102 and the cathode 104. The material of the isolation film 106 is, for instance, an insulating material, and the insulating material may be polyethylene, polypropylene or a combination thereof.

On the other hand, the lithium battery 100 may further include a polymer binder that enhances the mechanical properties of the electrode when applied to the anode 102 and/or the cathode 104. The polymer binder is, for instance, polyvinylidene fluoride (PVDF), styrene-butadiene rubber (SBR), polyamide, melamine resin, Carboxymethyl-Cellulose (CMC), a water-based binder (LA132, manufactured by Chengdu Indigo power sources CO., Ltd.) or a combination thereof.

It must be mentioned that, according to one embodiment of the invention, 'self-polymerizing substance' may be produced from the electrochemical reaction of the additive and water in the electrolyte solution 108 and the material having the oxygen-containing functional group of the anode 102, thus helping to improve the lithium battery performance.

Moreover, since the lithium battery 100 of the invention may contain water, there is no need to constrain the battery fabrication process to a anhydrous environment as the current technology demands, thus saving the electrical expenditure for maintaining a anhydrous environment for the battery fabrication process, and consequently reducing the fabrication cost.

The characteristics of the lithium battery in the above embodiments are described in detail with experimental examples below. However, the data of the experimental examples below are intended only to explain the battery capacity and the charge-discharge cycle characteristics of the lithium battery fabricated in the above embodiments, and are not intended to limit the scope of the invention.

EXPERIMENT

Experimental Example 8 parts by weight of graphite and 4 parts by weight of $NaNO_3$ with 560 parts by volume of concentrated $H_2SO_4$ are stirred for 2 hours. Then, 32 parts by weight of $KMnO_4$ is added to the above mixture which is then cooled in an ice bath for 2 hours. Then, after diluting with 800 parts by volume of deionized water, 5% hydrogen peroxide is added. The graphite is completely oxidized when the above mixture becomes brown. Then, the oxidized graphite slurry is dispersed in deionized water, and 0.1 M hydrochloric acid is added thereinto so as to remove the sulfate ions. Then, the pH value of the oxidized graphite slurry after washed with deionized water is about 5. Then, graphene powder is obtained after heating for 24 hours at 80° C. in the oven. Then, a heat treatment is performed for 2 hours at 300° C. and under an atmosphere of 15% $H_2$/85% $N_2$ in a high-temperature furnace to produce graphene powder (GNS-300) containing phenol group, quinone group, pyrone group, pyran group or lactone group.

Then, 89 parts by weight of graphene powder (GNS-300), 1 part by weight of conductive carbon black and 10 parts by weight of carboxymethyl cellulose and styrene-butadiene rubber are dispersed in deionized water. Then, an aluminum foil is coated by the slurry, and the anode is formed by drying, compressing, and cutting the coated aluminum foil.

Moreover, 2 parts by volume of propylene carbonate (PC), 3 parts by volume of ethylene carbonate (EC) and 5 parts by volume of diethyl carbonate (DEC) are mixed as the organic solvent in the electrolyte solution; $LiPF_6$ with a concentration of 1 M is used as the lithium salt of the electrolyte solution; and bismaleimide and vinylene carbonate are used as the additive in the electrolyte solution, wherein the structural formula of bismaleimide is shown in Formula 2, and the content of the bismaleimide in the electrolyte solution is 0.1 wt %, and the content of the vinylene carbonate in the electrolyte solution is 2 wt %.

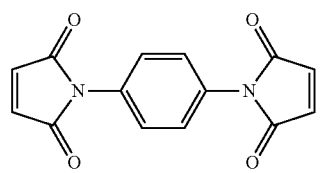

Formula 2

Then, the anode and the cathode are separated with the isolation film (PP), and the electrolyte solution is added to the housing region between the anode and the cathode with regular humidity (relative humidity >95%), wherein the content of the water is 100 ppm. Lastly, the above structure is sealed with the package structure to finish the fabrication process of the lithium battery, wherein the anode includes the oxygen-containing functional group and the electrolyte solution contains the additive and water.

Comparative Example 1

The lithium battery of comparative example 1 and that of the experimental example are different in the ingredients of the electrolyte solutions. The ingredients of the electrolyte solution of comparative example 1 include: the organic solvent formed by mixing 2 parts by volume of propylene carbonate (PC), 3 parts by volume of ethylene carbonate (EC) and 5 parts by volume of diethyl carbonate (DEC); the lithium salt (1 M LiPF$_6$); and the additive (bismaleimide and vinylene carbonate), wherein the structural formula of bismaleimide is shown in Formula 2, the content of the bismaleimide in the electrolyte solution is 0.1 wt %, and the content of the vinylene carbonate in the electrolyte solution is 2 wt %. Then, the anode and the cathode are separated with the isolation film, and the above electrolyte solution is added to the housing region between the anode and the cathode in a drying room environment, wherein the content of water is 20 ppm by Karl Fisher moisture meter. In comparison to the experimental example, the electrolyte solution of comparative example 1 is a anhydrous electrolyte solution.

Comparative Example 2

The lithium battery of comparative example 2 and that of the experimental example are different in the ingredients of the electrolyte solutions. The ingredients of the electrolyte solution of comparative example 2 include: the organic solvent formed by mixing 2 parts by volume of propylene carbonate (PC), 3 parts by volume of ethylene carbonate (EC) and 5 parts by volume of diethyl carbonate (DEC), and the lithium salt (1 M LiPF$_6$). Then, the anode and the cathode are separated with the isolation film, and the above electrolyte solution is added to the housing region between the anode and the cathode in a drying room environment, wherein the content of water is 20 ppm by Karl Fisher moisture meter. In comparison to the experimental example, the electrolyte solution of the comparative example 2 is a anhydrous electrolyte solution without additives.

Comparative Example 3

The lithium battery of comparative example 3 and that of the experimental example are different in the materials of the anodes. The preparation method of the anode material of the lithium battery in comparative example 3 is described below.

8 parts by weight of graphite and 4 parts by weight of NaNO$_3$ with 560 parts by volume of concentrated H$_2$SO$_4$ are stirred for 2 hours. Then, 32 parts by weight of KMnO$_4$ is added to the above mixture which is then cooled in an ice bath for 2 hours. Then, after diluting with 800 parts by volume of deionized water, 5% hydrogen peroxide is added. The graphite is completely oxidized when the above mixture becomes brown. Then, the oxidized graphite slurry is dispersed in deionized water, and 0.1 M hydrochloric acid is added thereinto so as to remove the sulfate ions. Then, the pH value of the oxidized graphite slurry after washed with deionized water is about 5. Then, graphene powder is obtained after heating for 24 hours at 80° C. in the oven. Then, a heat treatment is performed for 2 hours at 1400° C. in a high-temperature furnace to produce graphene powder (GNS-1400) that does not have phenol group, quinone group, pyrone group, pyran group or lactone group.

Comparative Example 4

The lithium battery of comparative example 4 and that of comparative example 3 are different in the ingredients of the electrolyte solutions. The ingredients of the electrolyte solution of comparative example 4 include: the organic solvent formed by mixing 2 parts by volume of propylene carbonate (PC), 3 parts by volume of ethylene carbonate (EC) and 5 parts by volume of diethyl carbonate (DEC), and the lithium salt (1 M LiPF$_6$). Then, the anode and the cathode are separated with the isolation film, and the above electrolyte solution is added to the housing region between the anode and the cathode in a drying room environment, wherein the content of water is 20 ppm by Karl Fisher moisture meter. In comparison to the comparative example 3, the electrolyte solution of comparative example 4 is a anhydrous electrolyte solution without additives.

Electrical Measurements

A. Battery Capacity:

The lithium batteries of the experimental example and comparative example 1 to comparative example 4 are charged and discharged with constant current/voltage. First, the lithium battery is charged to 0.005 V with a constant current of 0.1 mA/cm$^2$ until the current is less than or equal to 0.1 mA. Then, the lithium battery is discharged to the cut-off voltage (3.5 V) with a constant current of 0.1 mA/cm$^2$. The capacity per gram (milliamp hours per gram, mAh/g) and the efficiency of the lithium batteries of the experimental example and comparative example 1 to comparative example 4 are shown in Table 1 below.

Figure 2:
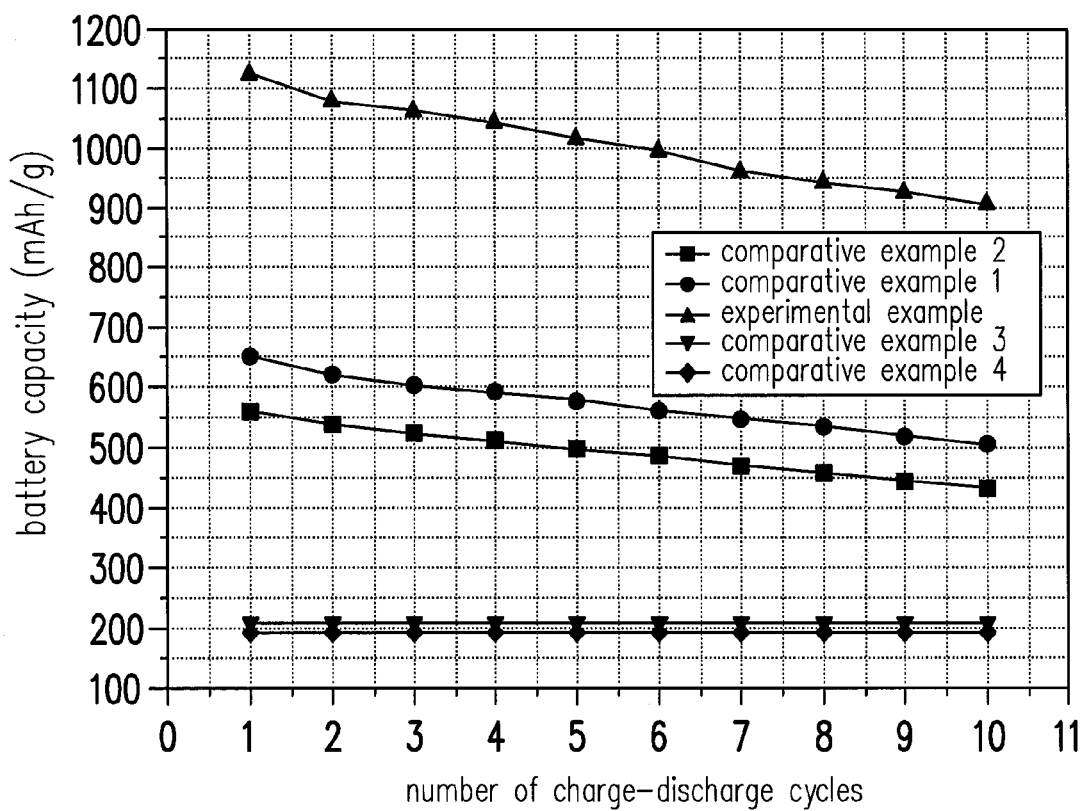
FIG. 2 is a diagram illustrating relation curves of the number of charge-discharge cycles and the battery capacity of the lithium batteries in the experimental example and the comparative examples 1 to 4 of the invention.

B. Charge-Discharge Cycle Test:

The lithium batteries of the experimental example and comparative example 1 to comparative example 4 are charged and discharged with constant current/voltage. First, the lithium battery is charged to 0.005 V with a constant current of 0.1 mA/cm$^2$ until the current is less than or equal to 0.1 mA. Then, the lithium battery is discharged to the cut-off voltage (3.5V) with a constant current of 0.1 mA/cm$^2$, and the above process is repeated by 10 times. The capacity per gram (milliamp hours per gram, mAh/g) of the lithium batteries of the experimental example and comparative example 1 to comparative example 4 are shown in Table 1 below. Moreover, FIG. 2 is a diagram illustrating relation curves of the number of charge-discharge cycles and the battery capacity of the lithium batteries of the experimental example and the comparative examples 1 to 4 of the invention.

TABLE 1

|  | Battery discharge capacity (mAh/g) of the 1st round | Battery discharge capacity (mAh/g) of the 5th round | Battery discharge capacity (mAh/g) of the 10th round |
|---|---|---|---|
| Experimental Example | 1138 | 1017 | 908 |
| Comparative Example 1 | 722 | 579 | 507 |
| Comparative Example 2 | 618 | 499 | 431 |
| Comparative Example 3 | 213 | 208 | 208 |
| Comparative Example 4 | 194 | 196 | 195 |

As shown in Table 1, after 10 cycles of charge and discharge, the battery capacity of the experimental example of the invention is increased by four-fold as compared to the comparative example 3. Moreover, as shown in the results of FIG. 2, the lithium battery in comparative example 4 in which the anode does not include the oxygen-containing functional group and the electrolyte solution contains no additive and little water, has worse cycle life and smaller battery capacity, whereas the lithium battery of the experimental example, in which the anode includes the oxygen-containing functional group, and the electrolyte solution contains the additive and water, has better cycle life and larger battery capacity. Moreover, the cycle lives and battery capacities of the lithium batteries of comparative example 1 with little water in the electrolyte solution, comparative example 2 with no additives and with little water in the electrolyte solution and comparative example 3 with no oxygen-containing functional groups in the anode are all between those of the lithium batteries of the experimental example and comparative example 4, wherein the lithium battery of comparative example 3, in which the anode does not include the oxygen-containing functional group, has the shortest cycle life and the smallest battery capacity.

It may be acquired from the above data that battery capacity and loop life can be effectively improved by the self-polymerizing substance produced by electrochemical reaction among the additives, water and the oxygen-containing functional groups, where the additives that are, for instance, bismaleimide and vinylene carbonate, in conjunction with the electrolyte solution containing a specific amount of water, are applied to the graphene lithium battery containing oxygen-containing functional groups in its anode. Moreover, the above data also show that lithium batteries with good battery capacities and loop lives may be fabricated with regular humidity (relative humidity>95%).

In summary, in the lithium battery of the above embodiments, the battery capacity and the cycle life are effectively improved by producing the self-polymerizing substance through electrochemically reacting the oxygen-containing functional group of the anode with the additive and water in the electrolyte solution. Moreover, the above embodiments reduces the electrical expenditure of the known fabrication process, thus effectively reducing the fabrication cost and improves safety.

Although the invention has been disclosed by the above embodiments, they are not intended to limit the invention. Persons skilled in this art may make some modifications without departing from the spirit and scope of the invention. Therefore, the protection range of the present invention falls in the appended claims.

What is claimed is:

1. A lithium battery, comprising:
   an anode, comprising a material having an oxygen-containing functional group, wherein the material having the oxygen-containing functional group comprises: carbide;
   a cathode, configured separately from the anode, wherein a housing region is defined between the anode and the cathode;
   an electrolyte solution, disposed in the housing region, comprising water, an organic solvent, an electrolyte and an additive, wherein the water, the additive and the material having the oxygen-containing functional group are configured to undergo an electrochemical reaction to produce a self-polymerizing substance, a content of the water is greater than 20 ppm and less than 300 ppm and the additive is selected from the group consisting of maleimide, polymaleimide, bismaleimide, polybismaleimide, copolymers of bismaleimide and maleimide, vinylene carbonate and a mixture thereof; and
   a package structure, covering the anode, the cathode and the electrolyte solution.

2. The lithium battery of claim 1, wherein the oxygen-containing functional group comprises phenol group, quinone group, pyrone group, pyran group, lactone group or a combination thereof.

3. The lithium battery of claim 1, wherein the carbide comprises hard carbon, soft carbon, a carbon black, graphite, graphene, carbon fiber, carbon nanotubes or a mixture thereof.

4. The lithium battery of claim 1, wherein the cathode comprises a lithium metal, a lithium mixed metal oxide or a combination thereof.

5. The lithium battery of claim 4, wherein the lithium mixed metal oxide comprises $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$, $LiFePO_4$, $LiMn_{0.5}Ni_{0.5}O_2$, $LiMn_{1/3}Co_{1/3}Ni_{1/3}O_2$, $LiMc_{0.5}Mn_{1.5}O_4$ or a combination thereof, where $0<x<1$, and Mc is a divalent metal.

6. The lithium battery of claim 1, wherein a content of the water is 100 ppm.

7. The lithium battery of claim 1, wherein the maleimide comprises N-phenylmaleimide, N-(o-methylphenyl)-maleimide, N-(m-methylphenyl)-maleimide, N-(p-methylphenyl)-maleimide, N-cyclohexylmaleimide, maleimide, maleimidophenol, maleimidobenzocyclobutene, phosphorus-containing maleimide, phosphonate-containing maleimide, siloxane-containing maleimide, N-(4-tetrahydropyranyl-oxyphenyl) maleimid, or 2,6-xylylmaleimide.

8. The lithium battery of claim 1, wherein a structural formula of the bismaleimide is shown in Formula 1:

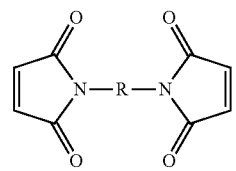

Formula 1 wherein R comprises:

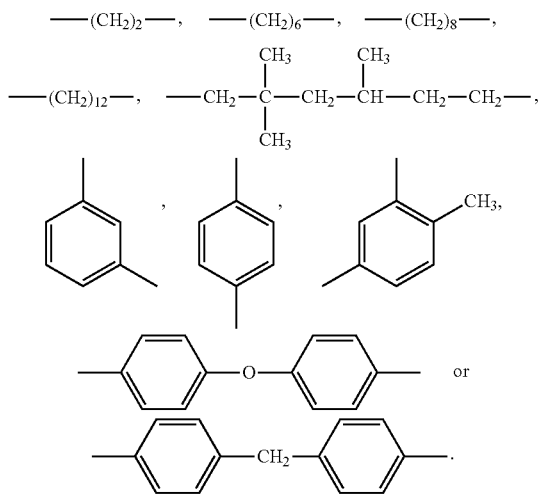

9. The lithium battery of claim 1, wherein a content of the additive is 0.05 wt % to 0.5 wt %.

10. The lithium battery of claim 1, wherein the organic solvent comprises γ-butyrolactone (GBL), ethylene carbonate (EC), propylene carbonate (PC), diethyl carbonate (DEC), propyl acetate (PA), dimethyl carbonate (DMC), ethylmethyl carbonate (EMC), or a combination thereof.

11. The lithium battery of claim 1, wherein a content of the organic solvent is 95 wt % to 99 wt %.

12. The lithium battery of claim 1, wherein the electrolyte is lithium salt.

13. The lithium battery of claim 12, wherein the lithium salt comprises $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$ or a combination thereof.

14. The lithium battery of claim 1, wherein a content of the electrolyte is 30 wt % to 40 wt %.

15. The lithium battery of claim 1, further comprising a polymer binder that separately reacts with the anode and/or the cathode.

16. The lithium battery of claim 15, the polymer binder comprises polyvinylidene fluoride (PVDF), styrene-butadiene rubber (SBR), polyamide, melamine resin, Carboxymethyl-Cellulose (CMC), a water-based binder (LA132, manufactured by Chengdu Indigo power sources CO., Ltd.) or a combination thereof.

17. The lithium battery of claim 1, wherein the material of the anode further comprises metal oxide.

18. The lithium battery of claim 17, wherein the metal oxide comprises $SnO$, $SnO_2$, $GeO$, $GeO_2$, $In_2O$, $In_2O_3$, $PbO$, $PbO_2$, $Pb_2O_3$, $Pb_3O_4$, $Ag_2O$, $AgO$, $Ag_2O_3$, $Sb_2O_3$, $Sb_2O_4$, $Sb_2O_5$, $SiO$, $ZnO$, $CoO$, $NiO$, $FeO$ or a combination thereof.

* * * * *